J. C. STEINER.
ROTATABLE TOOL HOLDER FOR LATHES.
APPLICATION FILED JAN. 20, 1919.
1,425,804.
Patented Aug. 15, 1922.
2 SHEETS—SHEET 2.
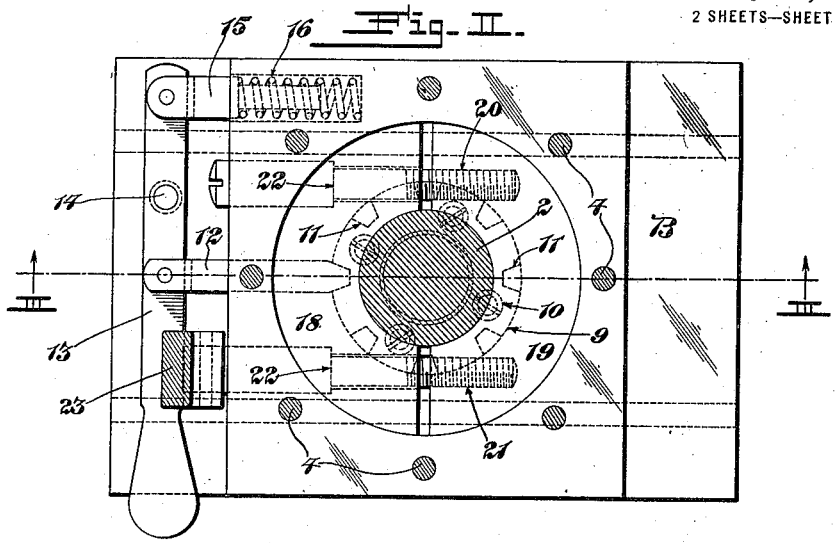
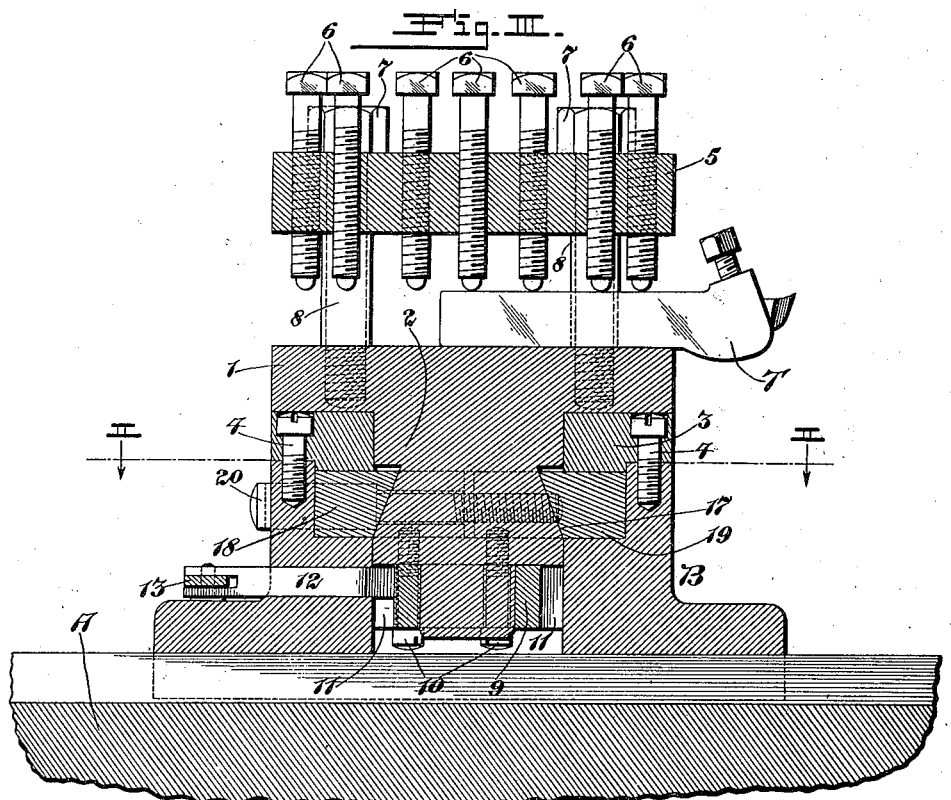
Attest.
Charles A. Becker.
Inventor
J. C. Steiner,
By Knight & Cook
His Attorneys.

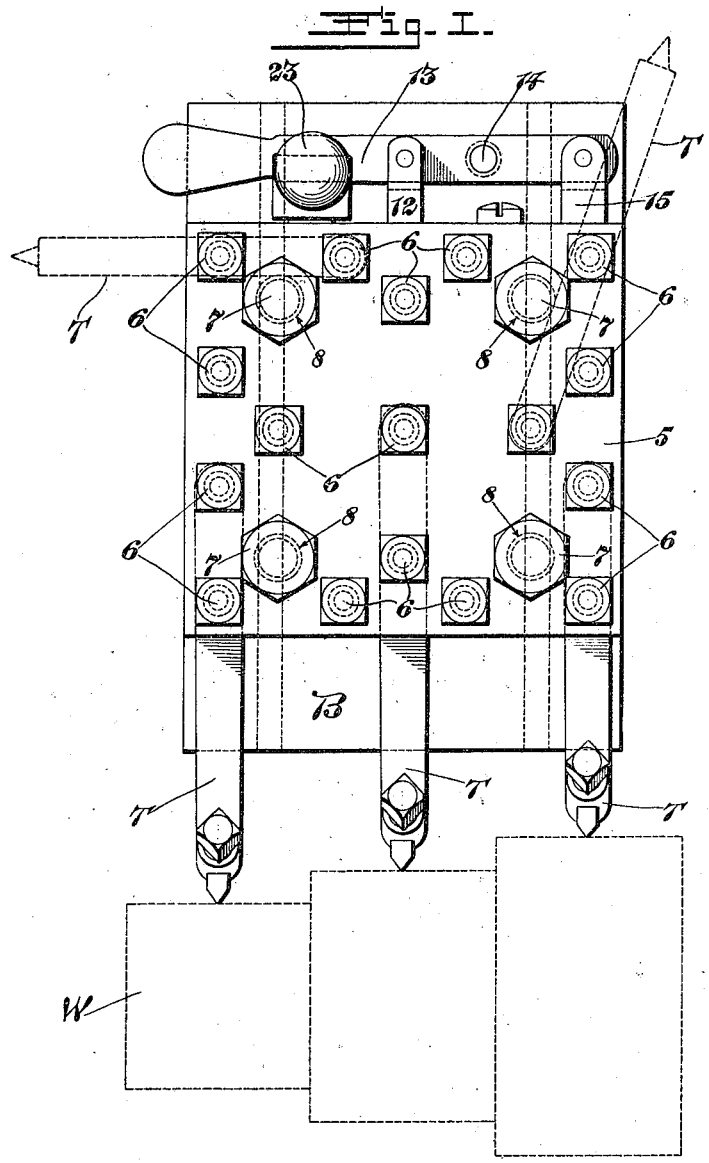

UNITED STATES PATENT OFFICE.

JOSEPH C. STEINER, OF ST. LOUIS, MISSOURI.

ROTATABLE TOOL HOLDER FOR LATHES.

1,425,804.                    Specification of Letters Patent.    Patented Aug. 15, 1922.

Application filed January 20, 1919. Serial No. 272,017.

*To all whom it may concern:*

Be it known that I, JOSEPH C. STEINER, a citizen of the United States of America, a resident of the city of St. Louis, in the State of Missouri, have invented certain new and useful Improvements in Rotatable Tool Holders for Lathes, of which the following is a full, clear, and exact description, reference being had to the accompanying drawings, forming a part of this specification.

My invention relates to improvements in rotatable tool holders for lathes, the main object being to produce a simple rotary tool holder whereby a variety of tools may be firmly secured, in many different positions, with their cutting edges positioned to perform different operations on the work. In the preferred form of the invention, a large open tool-receiving space is formed around the axis of the rotatable tool holder and the tools, or groups of tools, may be adjusted to any desired positions in this space and then firmly secured to the holder. For example, a group of tools may be properly adjusted and secured to perform an initial or rough cutting operation and a second group of tools may be secured to perform the finishing operation. In this event, the tools of one group will act simultaneously on the work, and after one operation has been performed the rotary tool holder will be turned on its axis to present the other group of tools to the work. The tools may be so positioned that a single tool will cooperate with a group of tools, or a single tool may be held in a peculiar or unusual position.

The tool holder I have shown to illustrate the invention is provided with a large horizontal tool-receiving face, and the several tools can be adjusted to any desired positions on this face and then firmly secured to the tool holder. The pivot for the rotatable tool holder lies entirely below the tool-receiving face, so it does not in any way obstruct the tools. To firmly hold the tools and prevent them from vibrating or chattering, I preferably use a relatively large strong pivot for the tool holding table, and this is a desirable feature in a device of this kind. However, the tools lie above the large pivot member, so the pivot does not occupy the tool-receiving space. This enables tools to be freely adjusted in the pivotally mounted tool holder. If desirable, one of the tools can extend across the axis of the pivot, while the others may lie directly above the large pivot member.

A further object is to provide an improved clamping means whereby the simple rotary tool holder is firmly secured in the positions to which it is adjusted.

Fig. I is a top or plan view of a rotatable tool holder embodying the features of this invention.

Fig. II is a horizontal section taken approximately on the line II—II, Fig. III.

Fig. III is a vertical section taken approximately on the line III—III, Fig. II.

In Fig. III of the drawings, A designates a portion of the carriage of a lathe, and B designates a cross slide mounted on the carriage and forming a base, or bearing, for the rotatable tool holder. The tool holder comprises a horizontal table 1 provided with a large pivot member 2 which extends into the base. The pivot member 2 extends downwardly from the table 1 and it lies entirely below said table. 3 designates a seat located around the axis of the pivot member and secured to the base by means of screws 4. The clamping device for securing the tools comprises a screw-holding block 5 mounted above the table 1 and separated therefrom to provide a large, open tool-receiving space wherein the tools T may be freely adjusted. 6 designates clamping screws mounted in the block 5 and extending into the tool-receiving space to clamp the tools onto the horizontal top face of the table 1. These screws 6 are located at various points around the axis of the tool holder, so as to secure the tools in the many different positions to which they may be adjusted. The lower ends of the screws 6 engage the tools and their upper ends are exposed above the block 5 to receive a wrench, or other adjusting tool.

Tension screws 7, connecting the block 5 to the table 1, are preferably surrounded by separating tubes 8 which lie between the table 1 and the block 5 to retain the latter in the elevated position shown in Fig. III. The tubes 8 prevent the block 5 from dropping toward the table when the screws 6 are disengaged from the tools. When the screws 6 are tightened on the tubes, screws 7 are placed under tension, but the block 5 does not rise or fall in response to the forces to which the screws 6 are subjected.

In Fig. I I have shown the work W by dotted lines, and it will be observed that the three tools T shown by full lines may be readily positioned and secured to act upon three different faces of the work. Different groups of tools may be positioned in the tool holder to perform successive cutting operations, or single tools may be extended from the tool holder, as shown by dotted lines in Fig. I. Obviously, the tools may be adjusted to almost any desired position in the large open space between the table 1 and the block 5, and the tools may be extended into this space far enough to be firmly seated on the table 1. A very large number of the screws 6 may be located around the axis of the tool holder so as to firmly secure the different tools which may extend in various directions from the different sides of the table 1. After one operation has been performed, the rotary tool holder may be turned on its axis to present another tool, or group of tools, to the work.

A ring 9 (Figs. II and III) is secured by means of screws 10 to the lower end of the pivot 2, and the peripheral face of this ring is provided with vertical slots 11 for the reception of a latch pin 12 slidably mounted in the base B. In the structure I have shown there are eight slots 11 in the ring 10, and the latch pin 12 will therefore pass into a slot 11 when the tool holder occupies any one of eight different positions. The means for operating the latch pin 12 comprises a lever 13 fulcrumed at 14 and pivotally connected to the latch pin. A spring-receiving pin 15 (Fig. II), pivoted to one end of the lever 13, extends into a pocket containing a spring 16 whereby the latch pin 12 is yieldingly held in the operative position shown by Figs. II and III.

I will now describe the means whereby the rotatable tool holder is firmly clamped to the base B and positively prevented from vibrating, or chattering, when the tools are in service. The lower portion of the pivot 2 is provided with a beveled annular face 17, formed concentric with the axis of the pivot, and a contractible clamping ring, consisting of semicircular sections 18 and 19, has a beveled inner face which cooperates with the beveled face 17. The contractible clamping ring lies in an annular groove in the face B, and the seat 3 (Fig. III) forms the top wall of this groove. The semicircular ring sections 18 and 19 are united through the medium of a connecting screw 20 passing through opposing ends of the ring sections, and a clamping screw 21 whereby the other ends of said sections are connected. The ring section 19 is threaded to receive the screws 20 and 21, and the ring section 18 is provided with relatively large openings for said screws. Each of these screws 20 and 21 is provided with an abutment shoulder 22, which engages a similar shoulder in the ring section 18. An operating handle 23 is secured to the clamping screw 21, and the connecting screw 20 may be adjusted to vary the operative positions of this handle 23. If the screw 20 is properly adjusted, the operator can retain the handle 23 in positions where it may be most conveniently manipulated to contract the clamping ring.

When the split clamping ring 18—19 is contracted through the medium of the screw 21, the beveled inner face of said ring cooperates with the corresponding bevel 17 on the pivot 2 (Fig. III), and the ring tends to move upwardly on the beveled face 17, while the pivot tends to move downwardly. The tool-receiving table 1 is thus firmly forced onto its large seat 3, while the ring 18—19 is forced into firm engagement with the pivot and also with the seat member 3. A study of Fig. III will show that the split ring very effectively cooperates with pivot 2, so as to very firmly secure the rotatable tool holder to the base B.

I claim:

1. In a rotatable tool holder for lathes, a horizontal tool-receiving table, a screw holder mounted above said table and separated therefrom to provide a large open tool-receiving space, tension members extending across said space and connecting said screw holder to said table, vertical clamping screws mounted in said screw holder and extending into said open space to clamp the tools onto said table, a vertical pivot located at the center of said table and extending downwardly from the bottom of said table, one of said clamping screws being located in said open tool-receiving space at a point directly above said pivot, and the other clamping screws being located at various points around the axis of said pivot, the large open tool-receiving space being formed directly above said pivot and entirely around said axis so as to allow the tools to extend directly across said axis and in various directions from the different sides of the table, said pivot lying entirely below said tool-receiving space and having its periphery cylindrical for a portion of its length, said periphery being beveled to provide a circular cam face concentric with the axis of the pivot, a stationary seat for the table located around the axis of said pivot, said seat having plane bottom and top faces and a circular inner face closely fitted to the cylindrical portion of the pivot so as to form a bearing therefor, and a contractible split cam ring cooperating with said beveled cam face on the pivot and also with the plane bottom face of said seat to force said table into firm engagement with the plane top face of said seat, said seat being interposed between said cam ring and table.

2. In a rotatable tool holder for lathes, a horizontal tool-receiving table, a screw holder mounted above said table, vertical spacing sleeves interposed between said screw holder and table to provide a large open tool-receiving space, vertical tension screws extending through said spacing sleeves to connect said screw holder to said table, vertical clamping screws mounted in said screw holder and extending into said open space to clamp the tools onto said table, a vertical pivot extending downwardly centrally of the bottom of said table, one of said vertical clamping screws being located at the axis of said pivot and the other vertical clamping screws being located at various points around the axis of said pivot, and the large open tool-receiving space being formed directly above said pivot and entirely around said axis so as to allow the tools to extend directly across said axis and in various directions from the different sides of the table, said pivot lying entirely below said tool-receiving space, and having its periphery cylindrical for a portion of its length, the remaining length of said pivot being peripherally beveled to provide a circular cam face concentric with the axis of the pivot, a stationary seat for the table formed around the axis of the pivot, said seat having plane bottom and top faces and a circular inner face closely fitted to the cylindrical face of the pivot so as to form a bearing therefor, and a contractible split cam ring cooperating with said beveled cam face on the pivot and also with the bottom face of said seat to force said table into firm engagement with the plane top face of said seat, said seat being interposed between said cam ring and table.

In testimony that I claim the foregoing I hereunto affix my signature.

JOSEPH C. STEINER.